United States Patent [19]

Hengel

[11] Patent Number: 4,604,172
[45] Date of Patent: Aug. 5, 1986

[54] PROCESS FOR THE ELECTROLYSIS OF SODIUM CHLORIDE

[75] Inventor: Rolf Hengel, Burgkirchen, Fed. Rep. of Germany

[73] Assignee: Hoechst Aktiengesellschaft, Fed. Rep. of Germany

[21] Appl. No.: 762,930

[22] Filed: Aug. 6, 1985

[30] Foreign Application Priority Data

Aug. 8, 1984 [DE] Fed. Rep. of Germany ....... 3429182

[51] Int. Cl.$^4$ ............................................. C25B 1/14
[52] U.S. Cl. ..................................... 204/98; 204/128; 204/296
[58] Field of Search .......................... 204/98, 128, 296

[56] References Cited

U.S. PATENT DOCUMENTS

| | | | |
|---|---|---|---|
| 2,559,752 | 7/1951 | Berry | 524/723 |
| 3,546,186 | 12/1970 | Gladding et al. | 526/245 |
| 4,151,053 | 4/1979 | Seko et al. | 204/98 |
| 4,178,218 | 12/1979 | Seko et al. | 204/98 |
| 4,340,680 | 7/1982 | Asawa et al. | 521/27 |
| 4,471,076 | 9/1984 | Blickle et al. | 521/33 |

FOREIGN PATENT DOCUMENTS 1516048  6/1978  United Kingdom ............... 204/296

OTHER PUBLICATIONS

"Equilibria in Reactions of Fluorocarbon Olefins, Imines, and Ketones with Fluoride Ion", John A. Young, J. Org. Chem., vol. 42, No. 25, 1977, pp. 4055–4058.

*Primary Examiner*—R. L. Andrews
*Attorney, Agent, or Firm*—Connolly & Hutz

[57] ABSTRACT

For the electrolysis of sodium chloride, the use of cation exchanger membranes is described which are composed of recurring units of

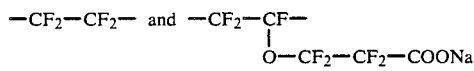

and have an ion exchange capacity of 1.55 to 1.74 m-equivalents/g of dry polymer in the H$^+$ form and a longitudinal expansion, during the hydrolysis of the ester form, of between 3.2 and 6.0%. A considerable decrease in the energy consumption is obtained with membranes of this type.

4 Claims, No Drawings

PROCESS FOR THE ELECTROLYSIS OF SODIUM CHLORIDE

The present invention relates to a process for the electrolysis of an aqueous solution of sodium chloride in electrolytic cells divided into an anode chamber and a cathode chamber by a cation exchanger membrane of a perfluorinated polymer with carboxyl groups.

The electrolysis of alkali metal chlorides for the large-scale production of chlorine and caustic alkali can in principle be carried out by three processes, namely the amalgam process, the diaphragm process and the membrane process. The last-mentioned process has enjoyed a very rapid development in the last decade, since ion exchanger membranes based on fluorine-containing polymers were successfully developed which are sufficiently stable under the electrolysis conditions and guarantee a current yield which can compete with the two first-mentioned processes. Membranes containing carboxyl groups and based on copolymers of fluorine-containing vinyl ethers and fluoro-olefines have been disclosed, for example by U.S. Pat. No. 4,178,218, which deals with terpolymers containing carboxyl groups, and by British Pat. No. 1,516,048 and U.S. Pat. No. 4,270,996, in which bipolymers of tetrafluoroethylene (TFE) and perfluorinated alkyl vinyl ethers containing carboxyl groups are described. Such membranes reach satisfactory current efficiency of about 94 percent at a relatively high cell voltage, so that an energy consumption of about 2,200 kWh/toluene of sodium hydroxide can be achieved. An improvement was obtained by means of membranes in which the anode-side layer carries sulfonic acid groups and the cathode-side layer carries carboxylic acid groups. Such membranes are described, for example, in U.S. Pat. No. 4,151,053 and U.S. Pat. No. 4,340,680. With such membranes, energy consumption can be obtained which is in general below a value of 2,150 kWh/tonne of sodium hydroxide, but they have the considerable disadvantage that metal hydroxides can deposit in the boundary layer of the two different copolymers; in a prolonged period of operation, this leads to a rise of the cell voltage and sometimes also adversely affects the bonding. It would therefore be an advantage to have single-layer membranes available which exhibit the outstanding energy yields of the composite membranes, but without their disadvantageous properties.

In order to meet this requirement, the cation exchanger membrane used according to the invention in the process for the electrolysis of sodium chloride is described at the outset, comprises a copolymer which as composed of recurring units of

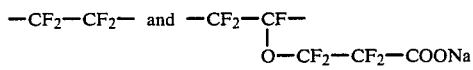

and has an ion exchange capacity of 0.55 to 1.74 m-equivalents/g of dry polymer in the H+ form and a longitudinal expansion at room temperature, caused by saponification of the ester form in 25% by weight aqueous potassium hydroxide solution at 90° C. over a period of 12 hours, of between 3.2 and 6.0%. Preferably, the ion exchange capacity is 0.58 to 1.70 m-equivalents/g, and the longitudinal expansion is 3.5 to 5%.

If, in the electrolysis of sodium chloride, such a single-layer membrane is used which is distinguished by the said short side chain in combination with a narrowly limited range of the ion exchange capacity and by a low longitudinal expansion, caused by swelling during the saponification of the intermediate ester form in potassium hydroxide solution, it is possible, surprisingly, to achieve energy yields such as were obtainable hitherto only with the known composite membranes, but without having to accept the disadvantages of the latter, described above.

A process for the preparation of the membranes used according to the invention starts with the preparation of the corresponding copolymer from tetrafluoroethylene and ω-hydroperfluoro-(propyl vinyl ether) (ω-HPPVE). The last-mentioned comonomer ω-HPPVE can be obtained by the method which has been described by Young et al. in J. org. Chem. 42 (1977), pages 4055 to 4058. The copolymerization of TFE and ω-HPPVE can in principle be carried out by all usual methods, such as are known for the copolymerization of fluoro-olefines, ie. by copolymerization in a suitable organic liquid as the polymerization medium, in particular in a chlorofluoroalkane, or in an aqueous medium by the process of suspension polymerization or emulsion polymerization. Preferably, the copolymer is prepared by the emulsion polymerization process in aqueous phase to give aqueous colloidal dispersions, from which the copolymer is then precipitated by coagulation by usual means, such as, for example, by high-speed stirring and/or by addition of a water-soluble electrolyte, and is washed and dried.

The copolymerization of TFE and ω-HPPVE takes place in the presence of initiators, such as are conventional for the copolymerization of fluoro-olefines. If it is carried out in an organic medium, in particular in a chlorofluoroalkane, bis-perfluoroacyl peroxides are especially suitable. For the copolymerization in aqueous phase, water-soluble peroxidic compounds, such as, for example, persulfates or perborates (each in the form of their alkali metal salts or ammonium salts), or $H_2O_2$ can be used. Moreover, redox initiator systems can be used, in particular for the copolymerization to give colloidal aqueous dispersions, which systems are composed of one of the peroxidic compounds mentioned or of other peroxides, such as, for example diacyl peroxides, and a reducing components, such as, for example, a water-soluble disulfite, thiosulfate, dithionite, hydrogen sulfite, a compound giving a diimine, such as azodicarboxylic acid or azodicarbonamide, or also Rongalit ® (addition product of sodium hydrogen sulfite and formaldehyde). Finally, the ammonium, alkali metal and alkaline earth metal salts of permanganic acid, manganic acid or manganous acid, in particular potassium permanganate, can also be advantageously used as the initiator.

In addition, fluorine-containing emulsifiers, such as are customary and conventional in the emulsion polymerization of fluoro-olefines and such as are described, for example, in U.S. Pat. No. 2,559,752, are used for the emulsion polymerization of TFE with ω-HPPVE. The alkali metal and ammonium salts of longer-chain perfluorocarboxylic acids, chlorofluorocarboxylic acids, perfluorodicarboxylic acids as well as perfluorosulfonic acids and perfluorophosphonic acids may be mentioned by way of example. Preferably, such emulsifiers have a carbon chain of 6 to 12 C atoms. The ammonium salts of perfluorooctanoic acid are the preferred emulsifiers for the preparation of the copolymers concerned here. Alkali metal and ammonium salts of perfluoropropoxypropionic acid may be mentioned as a further example of a class of very active emulsifiers. If appropriate, the said emulsifiers can also be employed in the form of the free acids and neutralized with ammonia. As far as possible, the emulsifiers used should be devoid of telogenic activities.

To obtain the ion exchange capacity required according to the invention, it is necessary that the copolymer has an ω-HPPVE content within the narrowly limited range from 19.8 to 23 mol %, preferably from 20.3 to 22.5 mol %. In order to be able to adjust the content to this figure, the monomers TFE and ω-HPPVE being used must be metered accurately and accurate pressure and temperature control must be ensured. The pressure should here be in the range from 3 to 8 bar, and the temperature should preferably be within the range from 20° to 60° C. In the copolymerization of TFE and ω-HPPVE, the last-mentioned comonomer must be present in a certain excess in the comonomer mixture, ie. in a higher molar proportion than that corresponding to the desired molar proportion in the copolymer which is to be prepared. This excess which is to be used and which is very small, in particular in the copolymerization to give aqueous colloidal dispersions, also depends to some extent on the type of the reaction vessel and the charging level therein. It can be determined by simple preliminary experiments.

The requisite range of longitudinal expansion (swelling under the defined hydrolysis conditions indicated) for the membranes used in the process according to the invention can in general obtained when the copolymer of TFE and ω-HPPVE (before functionalization) has a melt index value of less than 100 g/10 minutes at 200° C. and 11 kg loading. Under the polymerization conditions indicated, in particular in the temperature range indicated, such a value can readily be adjusted, if necessary by the use of a chain-transfer agent of suitable telogenic activity, such as, for example, acetone, chloroform, methylene chloride, methanol, ethanol and many other, which are known to those skilled in the art for the copolymerization of fluoro-olefines. For precise adjustment, the nature and the quantity of the chain-transfer agent and, if appropriate, alternatively or additionally also the concentration of the initiator can be changed. As increased addition or increased activity of the chain-transfer agent and/or an increased initiator concentration effect an increase in the longitudinal expansion; in the converse case, a decrease is obtained.

An addition of buffers for controlling the pH value of the aqueous liquor is advantageous. From amongst the buffer substances known to those skilled in the art, the alkali metal or ammonium hydrogen phosphates and the alkali metal or ammonium oxalates may be mentioned here only by way of example.

The copolymers prepared in this way are separated from the liquid medium in a suitable way—by conventional coagulation methods in the case of the aqueous colloidal disersion—and dried to give a powder.

The copolymer of TFE and ω-HPPVE, thus obtained, is functionalized by a suitable process, that is to say the ω-H-atoms of the ω-H-perfluoroalkoxy side chains are converted into —COOR groups, R being an aryl, cycloalkyl or alkyl radical, preferably an alkyl radical having 1 to 3 carbon atoms. This conversion can be effected by reacting the abovementioned copolymer of TFE and ω-HPPVE with peroxodisulfuryl difluoride to give a corresponding fluorosulfato derivative with the side chain end group —$CF_2$—$OSO_2F$ and subsequent reaction of these fluorosulfato derivatives with an alcohol to give the abovementioned ester group. This method of functionalization is described in detail in U.S. Pat. No. 4,471,076.

The route indicated represents the preferred preparation process. However, it is also possible to obtain such copolymers with a terminal ester group directly by copolymerizing TFE with a comonomer of the formula $CF_2$=CF—O—$(CF_2)_2$X, in which X is a COOR group (R=short-chain alkyl radical) or a group (for example CN, COHal, $CONR_2$) which ca be converted into such a COOR group. This method of copolymerization is known from U.S. Pat. No. 3,546,186.

A film of a thickness of 100 to 250 μm is produced by conventional methods, preferably by calendering or extrusion from a slot die, from the resulting copolymeer with a terminal alkoxycarbonyl group.

The ester group is removed by hydrolysis from the membrane film produced by this process. This can be effected in the conventional manner by an addition of acids, free carboxyl groups being formed, or by addition of alkalis, resulting in the salt form of the carboxyl group.

The ion exchange capacity is determined from the $^{19}F$ high-temperature NMR spectrum (376.5 MHz), recorded at 573K in 2-ethylhexyl adipate; reference substance $CFCl_3$. The signals at −79 to −86 ppm (—O—$CF_2$) and the signals between −105 and −125 ppm (all the $CF_2$ groups of the main chain) are integrated. Taking into account the fact that each —O—$CF_2$— grouping is associated with a —$CF_2$— group in the main chain, the content and hence the ion exchange capacity can then be calculated in a known manner.

For determining the longitudinal expansion (swelling), a sample of the ester form of the membrane is saponified under defined conditions, namely in 25% by weight aqueous potassium hydroxide solution at 90° C. for 12 hours, and then equilibrated for 12 hours in saturated sodium chloride solution. The change in length as compared with the original length is measured on this saponified sample.

The melt index value is determined in accordance with DIN Standard 53735-70, using a nozzle of 2.1 mm diameter and 8 mm length, at 300° C. and under a load having a mass of 11 kg (unless another temperature and loading is given in individual examples).

When the single-layer membranes, characterised by these selected features, namely 1. copolymerized recurring units as defined above,
2. a narrowly limited range of the ion exchange capacity as defined above, and
3. the longitudinal expansion (swelling) indicated above, are used according to the invention in the electrolysis of sodium chloride, the current efficiency and the energy consumption can be considerably improved as compared with other known single-layer membranes, and a long and troublefree operating period is nevertheless ensured. In the comparison examples which follow—relative to the examples according to the invention—it is shown that the improvement is not obtained if even only one of the two parameters (2) and (3) is not observed.

EXAMPLE 1

(a) Preparation of the copolymer 3000 ml of deionized water, 20 g of perfluorooctanoic acid and 18.6 g of ammonium oxalate are placed into an enamelled polymerization vessel of 4000 ml capacity, which is fitted with an impeller stirrer, and this aqueous phase is adjusted with ammonia to a pH value of 5. The vessel is then flushed with nitrogen and with tetrafluoroethylene. 150 g of ω-HPPVE are first introduced, the mixture is warmed to 32° C., TFE is injected until a pressure of 5 bar is reached and the polymerization is started with 100 ml of a 0.2% by weight aqueous potassium permanganate solution. While maintaining the above temperature, 20 l of TFE are fed in continuously. After the addition of 5, 8, 11, 14 and 17 liters of TFE, 50 ml of ω-HPPVE are metered in each time. During the reaction time of 135 minutes, a further 160 ml of the above potassium permanganate solution are pumped in continuously, in order to keep the reaction rate constant. After completion of the reaction, the kettle is carefully let down and flushed with nitrogen. The polymer is precipitated with hydrochloric acid from the almost water-clear dispersion and agglomerated by adding a small quantity of methylene chloride with stirring. The product is washed with water and dried in a fluidized bed. This gives 765 g of copolymer having a melt index value of 1.7 g/10 minutes, measured at 300° C. and 11 kg loading. The copolymer contains 21.8 mol % of ω-HPPVE (determined from the $^{19}F$ high-temperature spectrum). This product is then reacted with peroxodisulfuryl difluoride, as described in European Published Application No. 88,285, Example 2, and then esterified with methanol. The degree of conversion is more than 99%, and the yield is almost quantitative. This gives 770 g of functionalized product which contains 21.8 mol % of carbomethoxy groups, corresponding to an ion exchange capacity of 1.66 m-equivalents/g. This polymer is plasticized between polyimide sheets on a roll mill and milled out to give a 180 μm film, trimmed and saponified for 12 hours in 25% by weight potassium hydroxide solution at 90° C. The longitudinal expansion of the membrane is 4.8%.

(b) Use in chloro-alkali electrolysis

The membrane is fitted into an electrolytic cell which is provided with a rare metal-activated expanded titanium metal anode and a Raney nickel-activated cathode. The electrolysis is carried out at a current density of 3000 A/$m^2$ at 90° C. The anolyte concentration of the aqueous sodium chloride solution is adjusted to 200 g/l, and the hydroxide solution concentration is adjusted to 35.0% by weight. At a cell voltage of 3.00 V, this gives a current efficiency of 94.2%. This corresponds to an energy consumption of 2134 kWh/tonne of sodium hydroxide. This energy consumption remains constant for more than 5000 operating hours.

COMPARISON EXAMPLE 1

(a) The copolymerization is carried out as in Example 1, except that 450 g of ω-HPPVE in total are employed instead of 500 g. This gives 720 g of copolymer having a melt index value of 1.0 g/10 minutes, measured at 300° C. and 11 kg loading. The product contains 19.6 mol % of ω-HPPVE. The product functionalized by the method indicated in Example 1 contains 19.6 mol % of carbomethoxy groups, which corresponds to an ion exchange capacity of 1.54 m-equivalents/g. The longitudinal expansion of the membrane, determined by the method indicated in Example 1, is 3.5%.

(b) Under the electrolysis conditions of Example 1, a current efficiency of 93.0% is obtained at a cell voltage of 3.2 V. This corresponds to an energy consumption of 2305 kWh/tonne of sodium hydroxide.

COMPARISON EXAMPLE 2

(a) The copolymerization is carried out as in Example 1, except that 550 g in total are employed instead of 500 g of ω-HPPVE. This gives 815 g of copolymer having a melt index value of 3.0 g/10 minutes, measured at 300° C. and 11 kg loading. The product contains 23.9 mol % of ω-HPPVE. The product functionalized according to the method indicated in Example 1 then contains 23.9 mol % of carbomethoxy groups, which corresponds to an ion exchange capacity of 1.78 m-equivalents/g. The longitudinal expansion is 5.5%, measured as indicated in Example 1.

(b) Under the electrolysis conditions of Example 1, a current efficiency of 86.0% is obtained at a cell voltage of 2.95 V. This corresponds to an energy consumption of 2298 kWh/tonne of sodium hydroxide.

COMPARISON EXAMPLE 3

(a) 3000 ml of deionized water, 20 g of perfluorooctanoic acid, 22 g of dipotassium hydrogen phosphate and 40 mg of copper sulfate are placed into the polymerization vessel described in Example 1, and the pH value in this aqueous phase is adjusted with ammonia to 9. The vessel is then flushed with nitrogen and with TFE. 150 g of ω-HPPVE are first introduced, the mixture is warmed to 72° C., the pressure is increased to 8.5 bar by injecting TFE, and the reaction is started with 5 g of ammonium persulfate. 12 l of TFE are then fed continuously, the temperature being maintained at 72° C. After the addition of 2, 4, 6, 8 and 10 liters of TFE, 50 ml of ω-HPPVE are fed in each time. During the reaction time of 80 minutes, a further 10 g of ammonium persulfate are fed in, in order to keep the reaction rate constant. The copolymer formed is worked up, as described in Example 1, and this gives 760 g of product haing a melt index value of 42 g/10 minutes, measured at 200° C. and 5 kg loading. The product contains 21.5 mol % of ω-HPPVE. It is functionalized by the method indicated in Example 1 and then contains 21.5 mol % of carbomethoxy groups, which corresponds to an ion exchange capacity of 1.64 m-equivalents/g. The longitudinal expansion of the membrane, determined as indicated in Example 1, is 7.0%.

(b) Under the electrolysis conditions indicated in Example 1, a current efficiency of 85.0% is found at a cell voltage of 2.95 V. This corresponds to an energy consumption of 2326 kWh/tonne of sodium hydroxide.

EXAMPLE 2

(a) 3000 ml of deionized water, 20 g of perfluorooctanoic acid, 15 g of dipotassium hydrogen phosphate, 2 g of sodium hydroxide, 4 g of ammonium persulfate, 250 mg of iron sulfate and 500 mg of disodium ethylenedinitrilotetraacetate are placed into the polymerization vessel described in Example 1. The vessel is flushed with nitrogen and TFE. 116 g of ω-HPPVE are then introduced first, the mixture is warmed to 40° C., the pressure is increased to 5 bar by injecting TFE and the reaction is started with 30 ml of a solution of 5 g of Rongalit ® (addition product of sodium dithionite and formaldehyde) and 2 g of NaOH per 250 ml of water. 26 of TFE are then fed in continuously, the temperature being maintained at 40° C. After the addition of 4, 7, 10, 13, 16, 19, 22 and 25 liters of TFE, 30 ml (48 g) of ω-HPPVE are metered in each time. During the reaction time of 80 minutes, a further 70 ml of the said Rongalit ® solution are metered in, in order to keep the reaction rate constant. The isolation and working-up of the copolymer are carried out as described in Example 1. This gives 960 g of product having a melt index value of 20 g/10 minutes, measured at 300° C. and 11 kg loading. The copolymer contains 21.5 mol % of ω-HPPVE. The copolymer functionalized according to the method indicated in Example 1 then contains 21.5 mol % of carbomethoxy groups, which corresponds to an ion exchange capacity of 1.64 m-equivalents/g. The longitudinal expansion of the membrane, determined as indicated in Example 1, is 4.5%.

(b) At an anolyte concentration of 180 g/l and a hydroxide solution concentration of 35%, a current efficiency of 93.5% is found at a cell voltage of 2.98 V. This corresponds to an energy consumption of 2135 kWh/tonne of sodium hydroxide.

EXAMPLE 3

(a) 3000 ml of deionized water, 15 g of dipotassium hydrogen phosphate, 4 g of ammonium persulfate and 20 g of perfluoro-octanoic acid are placed into the polymerization vessel described in Example 1, and the pH value is adjusted with ammonia to 9. The vessel is flushed with nitrogen and with TFE, and 116 g of ω-HPPVE are first introduced, the mixture is warmed to 50° C., the pressure is increased to 6.5 bar by injecting TFE and the reaction is started with 20 ml of a solution of 4 g of sodium disulfite and 20 mg of copper sulfate in 400 ml of water. 20 l of TFE are then fed in, the temperature being maintained at 50° C. by cooling. After the addition of 3, 5, 7, 9, 11, 13, 15 and 17 liters of TFE, 30 ml (48 g) of ω-HPPVE are metered in each time. During the reaction time of 80 minutes, a further 70 ml of initiator solution are metered in, in order to keep the reaction rate constant. The isolation and working-up of the copolymer are carried out as indicated in Example 1. This gives 980 g of copolymer having a melt index value of 35 g/10 minutes, measured at 250° C. and 11 kg loading. The copolymer contains 22.0 mol % of ω-HPPVE. It is functionalized according to the method indicated in Example 1, and after this it contains 22.0 mol % of carbomethoxy groups, which corresponds to an ion exchange capacity of 1.67 m-equivalents/g. The longitudinal expansion of the membrane is 6.0%, determined as indicated in Example 1.

(b) At an anolyte concentration of 200 g/l and a hydroxide solution concentration of 35.0%, a current efficiency of 90.5% is obtained at a cell voltage of 2.95 V. This corresponds to an energy consumption of 2184 kWh/tonne of sodium hydroxide.

I claim:

1. A process for the electrolysis of an aqueous solution of sodium chloride in electrolytic cells divided into an anode chamber and a cathode chamber by a cation exchanger membrane of a perfluorinated polymer with carboxyl groups, wherein the cation exchanger membrane comprises a copolymer which is composed of recurring units of

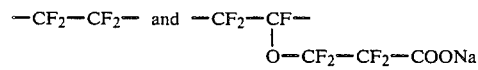

and has an ion exchange capacity of 1.55 to 1.74 m-equivalents/g of dry polymer in the H+ form and a longitudinal expansion at room temperature, caused by saponification of the ester form in 25% by weight aqueous potassium hydroxide solution at 90° C. over a period of 12 hours, of between 3.2 and 6.0%.

2. The process as claimed in claim 1, wherein the cation exchanger membrane has an ion exchange capacity of 1.58 to 1.70 m-equivalents/g of dry polymer.

3. The process as claimed in claim 1, wherein the longitudinal expansion of the cation exchanger membrane is between 3.5 and 5.5%.

4. The process as claimed in clam 1, wherein the cation exchanger membrane has a thickness of 100 to 250 μm and does not contain any reinforcing constituents.

* * * * *